US011415186B2

(12) United States Patent
Hollander et al.

(10) Patent No.: US 11,415,186 B2
(45) Date of Patent: Aug. 16, 2022

(54) AUTOMATIC REVERSING MECHANISM FOR A ROCK DRILL

(71) Applicant: Augspurger Komm Engineering, Inc., Phoenix, AZ (US)

(72) Inventors: Kevin Hollander, Scottsdale, AZ (US); Michael Craghead, Tempe, AZ (US)

(*) Notice: Subject to any disclaimer, the term of this patent is extended or adjusted under 35 U.S.C. 154(b) by 300 days.

(21) Appl. No.: 16/851,972

(22) Filed: Apr. 17, 2020

(65) Prior Publication Data
US 2020/0332843 A1 Oct. 22, 2020

Related U.S. Application Data

(60) Provisional application No. 62/835,033, filed on Apr. 17, 2019.

(51) Int. Cl.
*F16D 41/16* (2006.01)
*E21B 1/04* (2006.01)
*E21B 7/02* (2006.01)

(52) U.S. Cl.
CPC ............... *F16D 41/16* (2013.01); *E21B 1/04* (2013.01); *E21B 7/025* (2013.01)

(58) Field of Classification Search
CPC . E21B 1/04; F16D 41/14; F16D 41/16; F16D 41/125
See application file for complete search history.

(56) References Cited

U.S. PATENT DOCUMENTS

| | | | |
|---|---|---|---|
| 2018/0100551 A1* | 4/2018 | Campton | F16D 28/00 |
| 2018/0283419 A1* | 10/2018 | Tachibanada | F16D 41/125 |
| 2019/0170198 A1* | 6/2019 | Kimes | F16D 41/14 |
| 2019/0264760 A1* | 8/2019 | Peglowski | F16D 41/08 |

\* cited by examiner

*Primary Examiner* — Timothy Hannon
(74) *Attorney, Agent, or Firm* — Accelerate IP LLC (57) ABSTRACT

A rock drill automatic reversing system can comprise a rifle bar which can comprise a groove end and a pawl end, wherein the groove end has helical shaped grooves, a double pawl comprising a body, a first wing, and a second wing, a first pawl support having at least one first slot opening in a first radial direction and a second pawl support having at least one opposing slot opening in an opposing radial direction. At least one ring gear guide, and at least one control key rod that transverses parallel to the axis of the rifle bar within the first pawl support and the second pawl support to interact with the double pawl to change the direction of the rock drill depending on the at least one control key rod's state.

11 Claims, 6 Drawing Sheets

AUTOMATIC REVERSING MECHANISM FOR A ROCK DRILL

CROSS-REFERENCE TO RELATED APPLICATIONS

This application claims benefit from currently U.S. Provisional Application No. 62/835,033 titled "Automatic Reversing Mechanism for a Rock Drill" and having a filing date of Apr. 17, 2019, all of which is incorporated by reference herein.

TECHNICAL FIELD

The present specification relates to a reversing mechanism, more particularly an automatic reversing mechanism for a rock drill.

BACKGROUND

Commercial rock drills, such as the Mid-Western, LLC model MWS83, are used to hold rock drilling steel with bits which can create sinking shafts or drilling holes. The drill steel comes in a variety of lengths and hold numerous different styles of bits depending upon the type of rock to be drilled. The basic function of the rock drill is to provide a pneumatically driven impact to the back end of the drill steel in order to chip the rock surface. Upon retraction of the internal hammer, a ratcheting mechanism locks to create a small rotation of the drill steel and the end bit relative to the rock surface. On the next hammer strike, the end bit is in a slightly different rotational orientation as it chips away at the rock surface. The rotation of the end bit also aids in dislodging the freed rock chips before the next hammer impact occurs.

Figure 1:
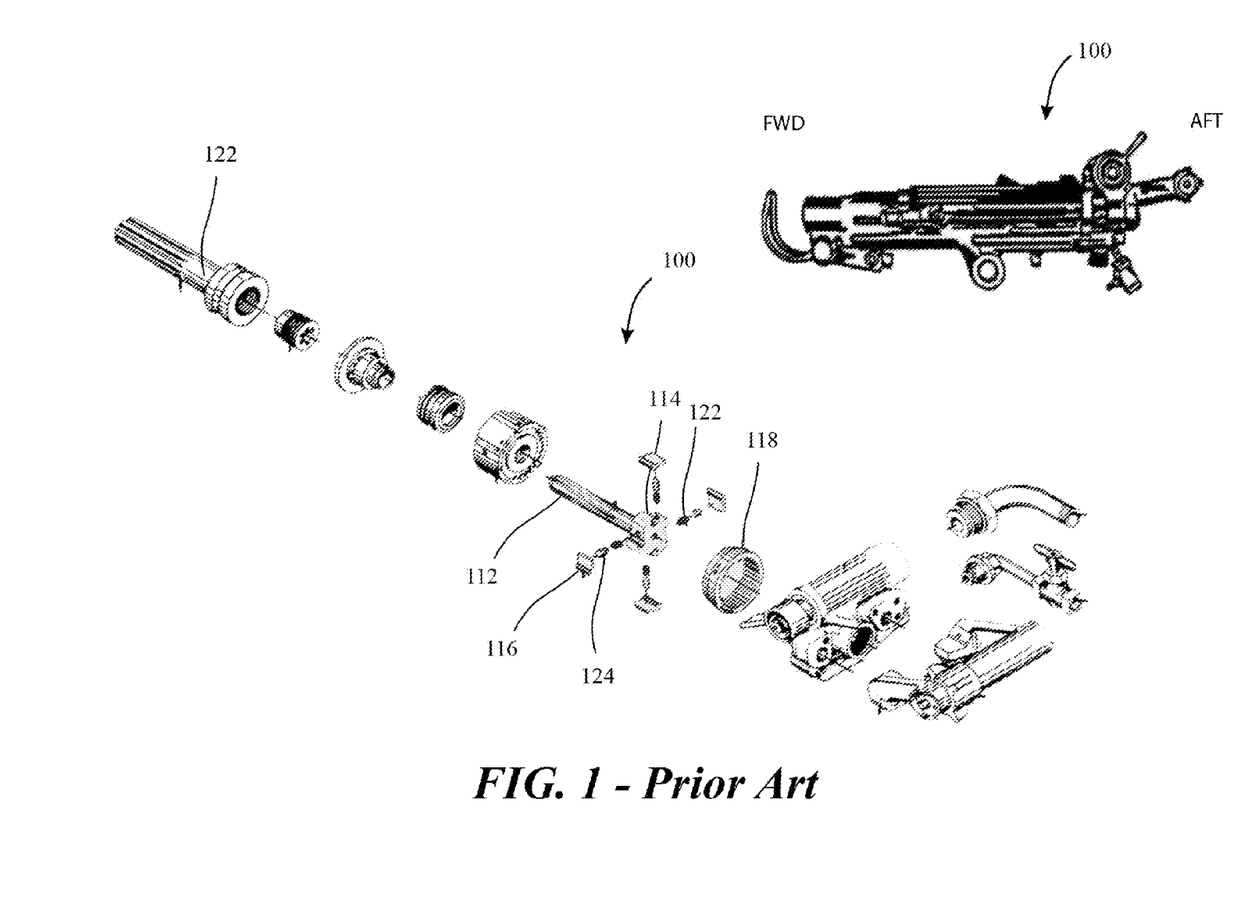
FIG. 1 is an exploded isometric view of the aft portion of the prior art rock drill and a side view of the complete prior art rock drill.

The basic operating mechanism for existing commercial drills consists of a pneumatically driven hammer, rifle bar/nut, and ratcheting mechanism (ring gear, pawls and springs). Imbedded in the back portion of the hammer is a nut that interfaces the rifle bar as shown in FIG. 1. The rifle bar and nut each contain a matching set of high helix grooves or threads that provide a coupled, relative rotation and translation between the two components. As the hammer is driven forward (like a piston), the helical interface between the rifle bar and nut, causes the rifle bar to rotate in one direction within the ring gear of the ratcheting mechanism. The spring-loaded pawls permit rotation relative to ring gear and lock into position on the ratchet ring's teeth keeping the drill from rotating in the opposite direction. On the return stroke of the hammer, the pawls are pushed outward towards the ratchet ring's teeth and are locked and force the hammer to rotate as it slides along the path of the rifle bar. This process is repeated over and over, creating a cumulative intermittent increase of rotational position of the drill steel. The issue with this type of drilling action is that it can only rotate in one direction, so that if something or someone where to get caught on drill bit or within the drill it can be sucked in causing damage or bodily injury to the person using the drill.

Therefore, it would be advantageous to provide a rock drill that can have a mechanism that allows a rock drill to rotate in both a forward and a reverse direction during constant use.

So as to reduce the complexity and length of the Detailed Specification, and to fully establish the state of the art in certain areas of technology, Applicants herein expressly incorporate by reference all of the following materials identified in each numbered paragraph below. The incorporated materials are not necessarily "prior art".

Benton, C. C. Clark, et al, *Jackleg Drill Injuries*, Mining Engineering, 2016.
Gardner-Denver, *S83F Feed Leg Drill*, Cooper Industries.
Gillerstrom A. Hilmer U.S. Pat. No. 2,610,030, "Drill Cradle," 1952.
F. M. Slater, U.S. Pat. No. 2,289,465, "Drill Mechanism," 1942.
Fuerer, G. H., U.S. Pat. No. 2,204,352, "Centralizer for Drill Steels," 1938.
Weston, Eustace, *Rock Drills Design, Construction and Use*, McGraw-hill Book Company, 1910.

Applicants believe that the material incorporated above is "non-essential" in accordance with 37 CFR 1.57, because it is referred to for purposes of indicating the background of the invention or illustrating the state of the art. However, if the Examiner believes that any of the above-incorporated material constitutes "essential material" within the meaning of 37 CFR 1.57(c)(1)-(3), applicants will amend the specification to expressly recite the essential material that is incorporated by reference as allowed by the applicable rules.

BRIEF SUMMARY OF THE INVENTION

A rock drill automatic reversing system can comprise a rifle bar which can comprise a groove end and a pawl end, wherein the groove end has helical shaped grooves, a double pawl comprising a body, a first wing, and a second wing, a first pawl support having at least one first slot opening in a first radial direction and a second pawl support having at least one opposing slot opening in an opposing radial direction. The first support and second pawl support can be secured to the pawl end of the rifle bar, wherein at least one first slot opening aligns with at least one opposing slot opening to accommodate the body of the double pawl. At least one ring gear guide, and at least one control key rod that transverses parallel to the axis of the rifle bar within the first pawl support and the second pawl support to interact with the double pawl to change the direction of the rock drill depending on the at least one control key rod's state.

A control plate that is at least partially free to rotate about the axis of the rifle bar, wherein the control plate comprises at least one countersink configured such that the at least one control key rod transverses parallel to the axis of the rifle bar by entering and exiting the countersink. The ratchet ring encompasses the first pawl support, the second pawl support, double pawl and ring gear guide. The control key rod can further comprise a control tip rod and a control rod slot. The first pawl support and the second pawl support further comprise at least one plunger hole wherein the plunger hole is configured to allow a plunger and a plunger spring to push against at least one of the ring gear guide and one of the double pawl.

The control plate is rotatably coupled to a control plate support ring, wherein the control plate support ring has a toothed outer circumference that engages with a toothed inner circumference of a ratchet ring such that the control plate support ring is unable to rotate relative to the ratchet ring. The control key rod further comprises a control rod slot wherein the plunger on the first pawl support can push against the double pawl until the control key rod changes state then the plunger and plunger spring on the second pawl support pushes against the double pawl changing the direction of the drill. The control plate comprises a control tooth and the control plate support ring comprise a support tooth such that the rotation of the control plate is at least partially constrained by the interaction of the control tooth with the support tooth. The control plate comprises a multiplicity of countersinks and wherein the countersinks are asymmetrically situated about the control plate. The automatic reversing system according to claim 2, wherein the countersinks have at least 45-degree chamfer.

There is a first countersink, a second countersink, a third countersink and a fourth countersink wherein the angular spacing between the first countersink and second countersink is between 50 and 90, and spacing between second countersink and third countersink is between 110 and 130, and spacing between third countersink and fourth countersink is between 50 and 90, and spacing between fourth countersink and first countersink is between 110 and 130. The first countersink, a second countersink, a third countersink and a fourth countersink wherein the angular spacing between the first countersink and second countersink is about 70 degrees, and spacing between second countersink and third countersink is about 110 degrees, and spacing between the third countersink and fourth countersink is about 70 degrees, and spacing between fourth countersink and first countersink is about 110 degrees.

In other embodiments, the automatic reversing mechanism for a rock drill can comprise of a double helix creating two or more non-intersecting helical paths on a drive screw in opposing directions wherein the non-intersecting helical paths can create an oscillation between the rotational striking positions wherein a ratcheting mechanism of a drill system can be attached to a ratchet support wherein the double helix path can create an oscillation between the rotational striking positions allowing the rotational direction of the drill to be changed by using a helical path of one or more rifle bars wherein a rifle bat can be attached to one or more pin nuts wherein the rifle bar and pin nut can move along the paths of the shaft wherein the path can have different zones during operation such as an impact zone, helix rotational zone, and a path change zone.

In yet another embodiment, the automatic reversing mechanism for a rock drill can be removably attached to a drill which can comprise a ratchet mechanism which can only rotate in one direction and blocked from rotating in the opposite direction. The current rock drill can further comprise a rifle bar which can comprise a straight spline or a smooth shaft to act as a guide for the rock drill hammer. A hammer can provide an impact force to the drill steel without any rotation. At the far end of the drill steel wherein the use of an internal spring keeps the bit driver mechanism separated and held ready for activation.

Aspects and applications of the invention presented here are described below in the drawings and detailed description of the invention. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the. Absent such clear statements of intent to apply a "special" definition, it is the inventor's intent and desire that the simple, plain, and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112 (f). Thus, the use of the words "function," "means" or "step" in the Detailed Description or Description of the Drawings or claims is not intended to somehow indicate a desire to invoke the special provisions of 35 U.S.C. § 112 (f), to define the invention. To the contrary, if the provisions of 35 U.S.C. § 112 (f) are sought to be invoked to define the inventions, the claims will specifically and expressly state the exact phrases "means for" or "step for", and will also recite the word "function" (i.e., will state "means for performing the function of molding a fishing lure, without also reciting in such phrases any structure, material or act in support of the function. Thus, even when the claims recite a "means for performing the function of molding a fishing lure, step for performing the function of molding a fishing lure," if the claims also recite any structure, material or acts in support of that means or step, or that perform the recited function, then it is the clear intention of the inventors not to invoke the provisions of 35 U.S.C. § 112 (f). Moreover, even if the provisions of 35 U.S.C. § 112 (f) are invoked to define the claimed inventions, it is intended that the inventions not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

Additional features and advantages of the present specification will become apparent to those skilled in the art upon consideration of the following detailed description of the illustrative embodiment exemplifying the best mode of carrying out the invention as presently perceived.

BRIEF DESCRIPTION OF THE DRAWINGS

These and other features, aspects, and advantages of the present specification will become better understood with regard to the following description, appended claims, and accompanying drawings where:

DETAILED DESCRIPTION

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

Referring initially to FIG. 1, shows an exploded isometric view of a back portion of a common rock drill 100 as shown in the prior art. A common prior art rock drill 100 includes a rifle bar 112 and a pawl support 114 wherein the rifle bar 112 and pawl support 114 are one piece. The pawl support 114 can comprise four pawls 116 which can be connected to four slots within the pawl support 114 wherein the pawls can rotate freely within the slot allowing at least one pawl spring 122 and at least one plunger 124 to push against the pawls 116 in an outward direction against the plurality of teeth on the inner diameter of the ratchet ring 118. The pawls 116 can engage at least one tooth on the inner diameter of the ratchet ring 118 which only allows the rock drill 100 to rotate in one direction.

Figure 2:
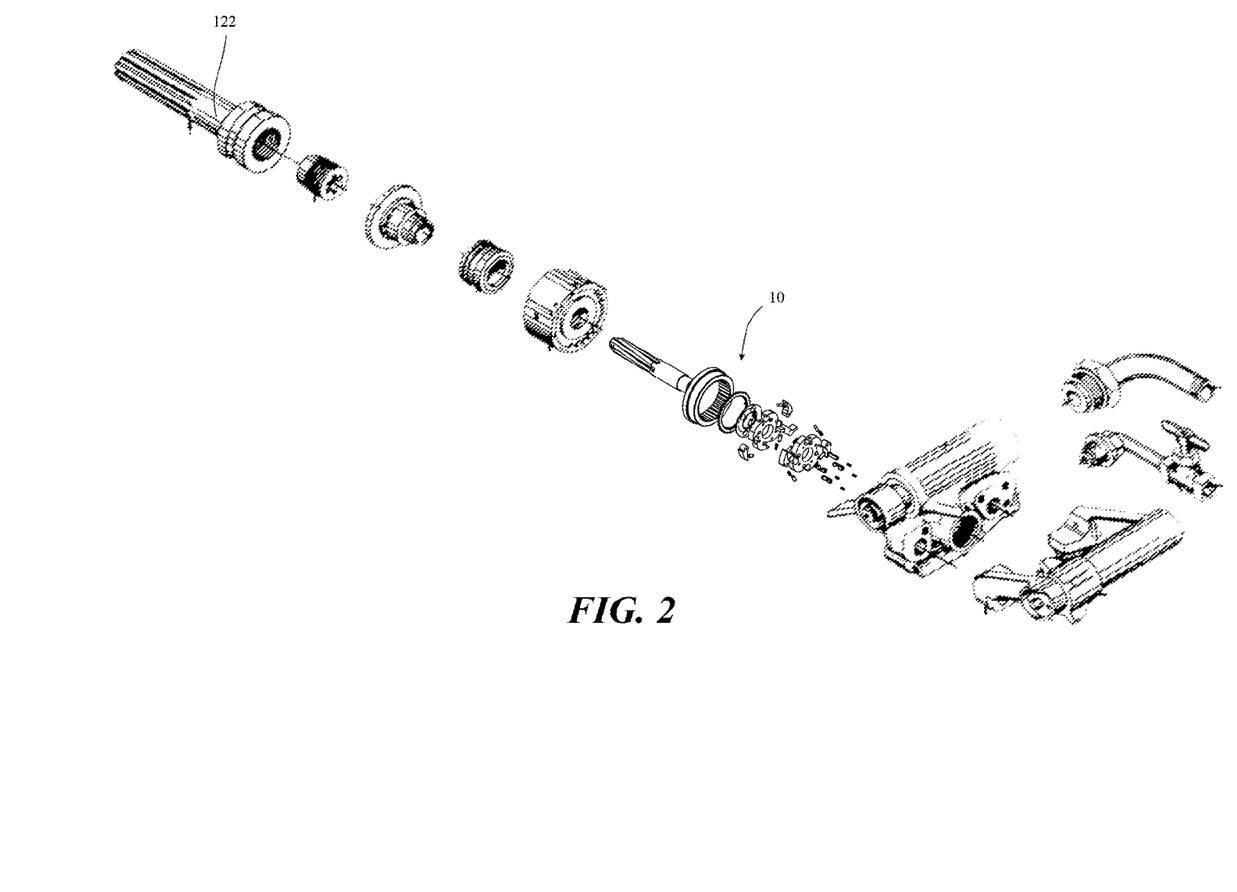
FIG. 2 is an exploded isometric view of an automatic reverse mechanism placed in the prior art rock drill in accordance to one, or more embodiments.
Figure 3:
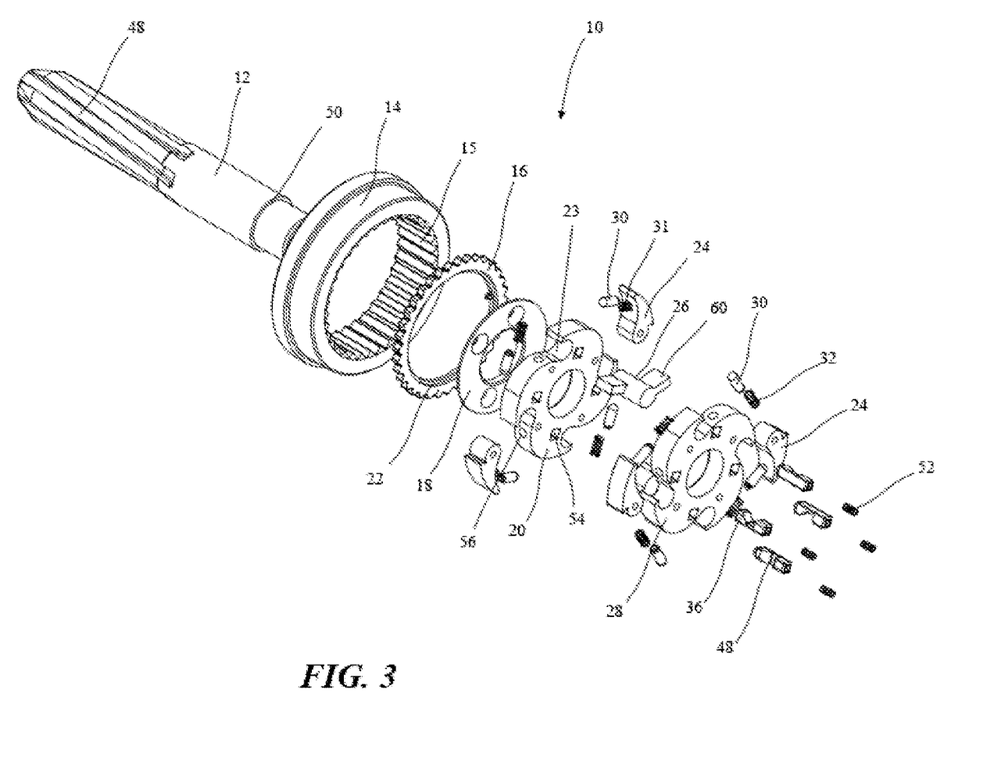
FIG. 3 is a complete exploded isometric view of an automatic reverse mechanism in accordance to one, or more embodiments.

The current invention, an automatic reversing mechanism 10 replaces the rifle bar 112, pawl support 114, pawls 116 and ratchet ring 118 of the prior art rock drill as shown in FIGS. 1 and 2. Referring to FIGS. 2-5c an automatic reversing mechanism 10 comprising a rifle bar 12 wherein the rifle bar can be attached to a first pawl support 20 and a second pawl support 28. The first pawl support 20 and the second pawl support 28 can have at least one slot 23 to accept at least one double pawl 26 and may also include at least one additional slot 23 to accept at least one ring gear guide 24. The double pawl 26 includes a cylindrical body 25 and wings 60, 62. The double pawl 26 can extend from the first pawl support 20 to the second pawl support 28 wherein the slots 23 in the first pawl support 20 and the second pawl support 28 are aligned to accept the body 25 of the double pawl 26. The slots 23 in first pawl support 20 and the second pawl support 28 can face opposite directions i.e., the slots in the first pawl support 20 open in a clockwise direction and the slots 23 in the second pawl support 28 open in a counterclockwise direction, or vice versa. The slot 23 of one pawl support open in the clockwise direction aligns with the slot 23 of the other pawl support to accommodate the body 25 of the double pawl 26 in the aligned slots 23. The shape of the aligned slots allows the body 25 of the double pawl 26 to rotate, allowing a first wing 60 and second wing 62 of the double pawl to toggle back and forth. The slots 23 can be machined, wire EDM, molded, casted or the like into the first pawl support 20 and the second pawl support 28.

The first pawl support 20 and the second pawl support 28 can further comprise at least one control key rod hole 54 and at least one alignment pin hole 29 wherein the control rod key hole and alignment pin hole can go through the top and bottom surfaces of both the first pawl support and the second pawl support. The first pawl support 20 and the second pawl support 28 can further comprise at least one plunger hole 56 on the outer surface of the first pawl support 20 and the second pawl support 28. The control key rod hole 54 and the plunger hole 56 can be square, circular, oval, rectangular or the like in shape. The first pawl support 20, the second pawl support 28 and riffle bar 12 can be manufactured of any suitable material such as, for example, carbon steel, stainless steel, plastics or the like. The control key rod hole 54 can be configured to accept a control key rod 36 and control key rod spring 52 wherein the control key rod 36 can slide forward and aft in both the first pawl support 20 and the second pawl support 28. The control key rod 36 can be the same shape as the control keyhole. The control key rod 36 can further comprise control rod slot 48 and a control rod tip 58 wherein the control rod tip can be rounded or chamfered.

The rifle bar 12 further comprises a groove end and a pawl end wherein the groove end can have one or more helical shaped grooves 48 extending axially from its forward end, and a shoulder 50 near its aft end wherein the first pawl support 20 can mate up against the shoulder 50 and the second pawl support 28 can mate up against the first pawl support 20. The first pawl support 20 and the second pawl support 28 can be attached to the rifle bar 12 by for example, welding, brazing, press fitting, or the like. In certain embodiments, the rifle bar 12 and the first pawl support 20 can be a single integral unit and the second pawl support 28 can be attached to wherein the single unit can be machined, molded, casted, or the like. The forward end of the rifle bar 12 can accept thrust from a piston component 122, which can rotate the automatic reversing mechanism 10 with every forward and aft motion.

The automatic reversing mechanism 10 further comprises a ratchet ring 14 and a control plate support ring 16. The control plate support ring 16 has a plurality of teeth 44 on its outer circumference that matches a plurality of teeth 15 on the inner circumference of the ratchet ring 14 so that the control plate support ring 16 can be secured on the inner diameter of the ratchet ring 14. The control plate support ring supports a control plate 18 and allows for the support plate to at least partially free to rotate on a shoulder 22 on the inner diameter of the control plate support ring about the axis of the rifle bar. The control plate support ring 16 and the control plate 18 can be inserted into the ratchet ring 14 wherein the ratchet ring's teeth 15 can engage the control support ring's teeth and can keep the control plate support ring from rotating freely. The ratchet ring 14 encompasses the first pawl support 20, the second pawl support 28, double pawl 26 and ring gear guide 24.

The control plate 18 comprises a multiplicity of countersinks 46 configured such that the at least one control key rod 38 transverses parallel to the axis of the rifle bar in the control key rod hole 54 by entering and exiting the countersink wherein at least two countersinks are staggered from at least 45 degrees to at least 160 degrees from its neighboring hole. The automatic reversing system according to claim 2, wherein the countersinks 46 have at least 45-degree chamfer. The countersink 46 can be a first countersink, a second countersink, a third countersink and a fourth countersink wherein the angular spacing between the first countersink and second countersink is between 50 and 90 degrees, and spacing between second countersink and third countersink is between 110 and 130 degrees, and spacing between third countersink and fourth countersink is between 50 and 90 degrees, and spacing between fourth countersink and first countersink is between 110 and 130 degrees. The angular spacing between the first countersink and second countersink is about 70 degrees, and the spacing between second countersink and third countersink is about 110 degrees, and the spacing between the third countersink and fourth countersink is about 70 degrees, and the spacing between fourth countersink and first countersink is 110 degrees.

Figure 4A:
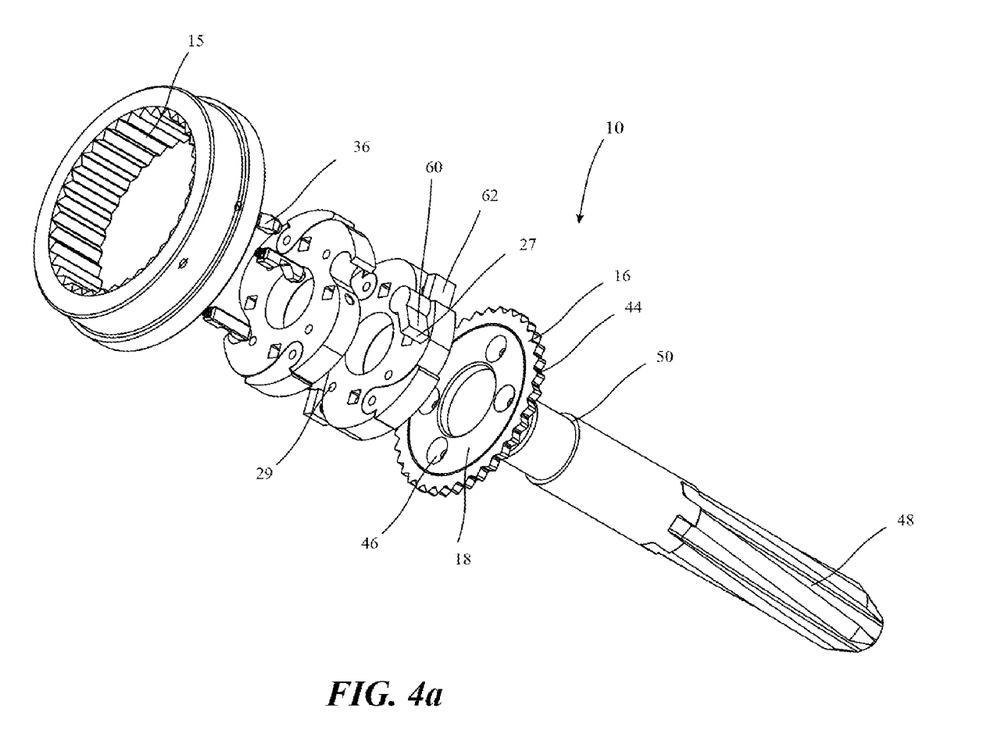
FIG. 4a is a top partial exploded isometric view of an automatic reverse mechanism in accordance to one, or more embodiments.
Figure 4B:
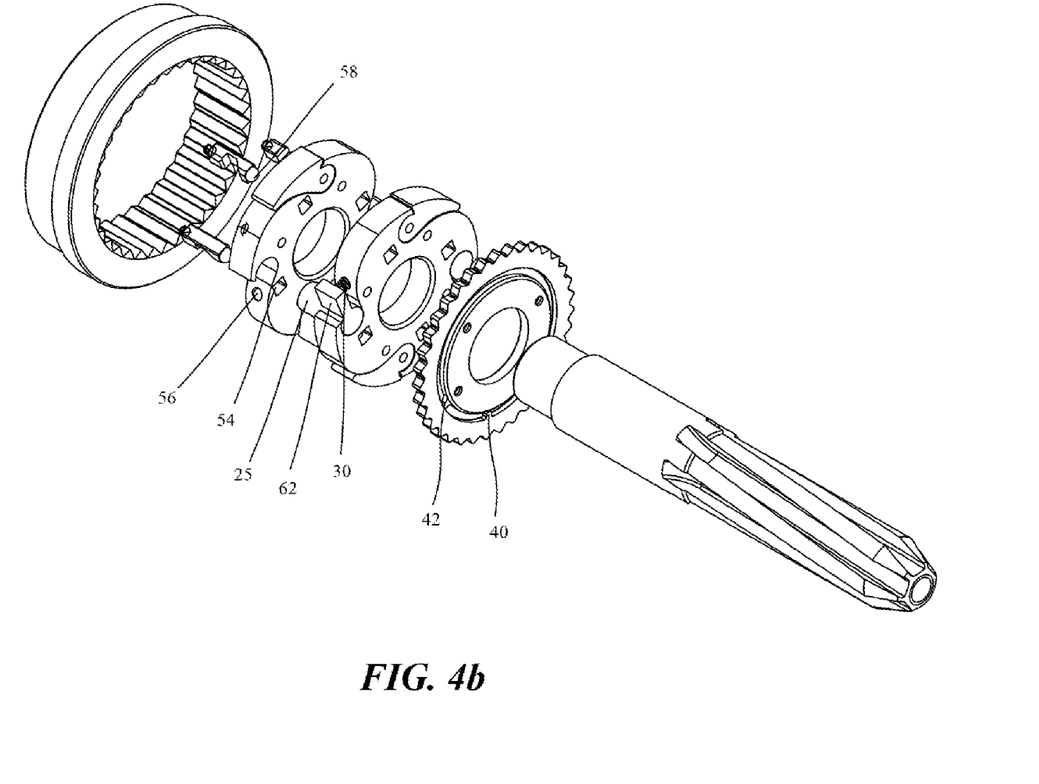
FIG. 4b is a bottom partial exploded isometric view of an automatic reverse mechanism in accordance to one, or more embodiments.
Figure 5A:
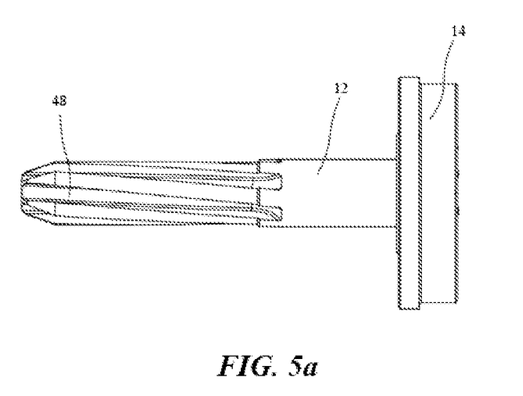
FIG. 5a is a side view of an automatic reversing mechanism for a rock drill in accordance to one, or more embodiments.
Figure 5B:
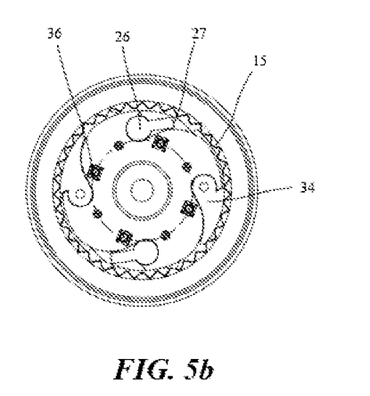
FIG. 5b is a top view of an automatic reversing mechanism for a rock drill in accordance to one, or more embodiments.
Figure 5C:
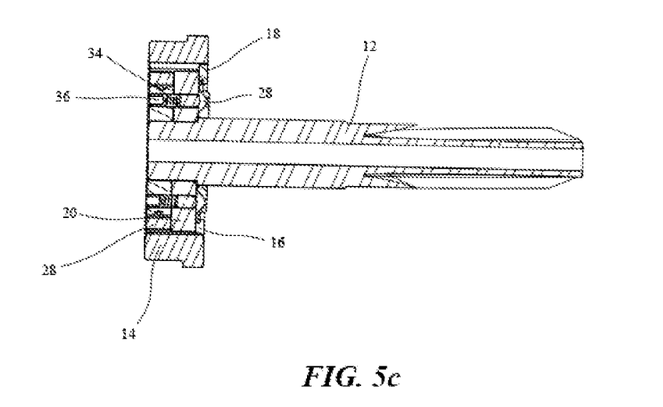
FIG. 5c is a cross-sectional view of an automatic reversing mechanism for a rock drill in accordance to one, or more embodiments.

The control plate support ring 16 can have a support tooth 40 on its forward surface, and the control plate 18 can have an opposing control tooth 42 on its aft surface as shown in FIG. 4b. As the control plate 18 rotates within the control plate support ring 16 the control tooth 42 can be at least partially constrained by the interaction of the support tooth 40 on the control plate support ring 16 and can stop the control plate's 18 rotation relative to the ratchet ring 14. In certain embodiments, the control plate support ring 16 can be permanently affixed to the ratchet ring 14, or the control plate support ring can be incorporated into the ratchet ring as one piece. The countersinks 46 can be such as, for example, a countersink, shell sink, cross-hole sink, chamfered hole, or the like. In the preferred embodiment, the countersinks can be a 45-degree angle but can be any suitable angle to allow the control key rod to easily enter and exit the countersink.

The double pawl's 26 first wing 60 and a second wing 62 each having a flat tip 27 wherein the flat tip can be used to stop axial rotation in a single direction by engaging the flat tip into a groove of at least one tooth of the ratchet ring 14. The ratchet ring's teeth 15 can be symmetric so that the double pawl first wing 60 or second wing 62 flat tip 27 can engage at least one tooth in either axial directions. In certain embodiments the double pawl 26 can be at least two pieces wherein one connects to the slot in the first pawl support 20 and the other connects to the slot of the second pawl support 28.

The first pawl support 20 and second pawl support 28 each comprise at least one plunger 30 and at least one plunger spring 31, 32. The plunger spring 31, 32 in one pawl support has a higher k value than the spring in the other pawl support. In a particular embodiment, each slot 23 has a plunger 30 and plunger spring 31, 32. The plunger 30 and the plunger spring 32 exerts a force in the direction opposite to the direction in which the slot 23 is open. In slots 23 accommodating a ring gear guide 24 the plunger 30 and spring biases the ring gear guide 24 radially outward from the pawl support 20, 28. In slots 23 accommodating the body 25 of the double pawl 26 the plunger 30 and the spring 32 bias the wing 60, 62 of the double pawl 26 radially outward from the pawl supports 20, 28.

The control plate rotates within the control plate support ring 16 until the control tooth 40 comes into contact with the support tooth 42 thus stopping the rotation of the control plate allowing for the control key rods 36 to slide within the first and second pawl supports into the countersink changing the position of the control key rod and the force applied to the plunger 30 and plunger spring 31 of the first pawl support 20 or releasing the applied force to the plunger and plunger spring of the first pawl support.

The second pawl support 28 plunger 30 and plunger spring 32 can be constantly engaged with the double pawl second wing. In certain embodiments the control key rod 36 can release the force from either the first pawl supports plunger 30 and plunger spring 31 or the second pawl support plunger and plunger spring 32. As the control key rod 36 transverses parallel to the axis of the rifle bar within the first pawl support and the second pawl support the control key rod pushes and releases the plunger 30 and the plunger spring 32 of either the first pawl support 20 or the second pawl support 28 wherein when the control key rod is in the countersink 46 the plunger and plunger spring can push against either the first wing 60 or the second wing 62 of the double pawl 26 of the first pawl support or the second pawl support. When the control key rod 36 is touching the surface of the control plate 18 the opposite plunger 30 and plunger spring 32 can push against the first wing 60 or second wing 62 of the double pawl 26 thus engaging the double pawl second wing 62 of the second pawl support and releasing the plunger and plunger spring in the first pawl support.

The control key rod 36 can be forced to transverse parallel to the axis of the rifle bar 12 creating different contact states based upon the position of the control key rod on the surface of the control plate 18. Based upon the control key rod's 36 position, either forward or aft, the control key rod can engage or disengage the first pawl support 20 plunger springs 31 and plunger 30, or second pawl support 28 plunger and plunger springs, which can push against the surface of the first wing 60 or second wing 62 of the double pawl which can engage the first wing or second wing flat tip 27 into the teeth of the ratchet ring 14. When the first pawl support 20 plunger 30 and plunger spring 31 is released the second pawl support 28 plunger and plunger spring can push against the second wing of double pawl thus allow the double pawl flat tip 27 to engage the ratchet ring's teeth when rotating in one direction or the other depending on the state that it is in. The forward and aft movement of the control key rod 36 dictate the state of the automatic reversing mechanism 10 and control the automatic reversing mechanisms rotational direction wherein only the first wing 60 or the second wing 62 flat tip 27 from either the first pawl support 20 or the second pawl support 28 of the double pawl 26 can be engaged with the ratchet ring 14 at a time only allowing either the first pawl support 20 or the second pawl support 28 to be engaged with the ratchet ring 14 thus changing the rotational direction of the drill as the piston 122 moves forward and aft.

In closing, it is to be understood that although aspects of the present specification are highlighted by referring to specific embodiments, one skilled in the art will readily appreciate that these disclosed embodiments are only illustrative of the principles of the subject matter disclosed herein. Therefore, it should be understood that the disclosed subject matter is in no way limited to a particular methodology, protocol, and/or reagent, etc., described herein. As such, various modifications or changes to or alternative configurations of the disclosed subject matter can be made in accordance with the teachings herein without departing from the spirit of the present specification. Lastly, the terminology used herein is for the purpose of describing particular embodiments only and is not intended to limit the scope of the present disclosure, which is defined solely by the claims. Accordingly, embodiments of the present disclosure are not limited to those precisely as shown and described.

Certain embodiments are described herein, including the best mode known to the inventors for carrying out the methods and devices described herein. Of course, variations on these described embodiments will become apparent to those of ordinary skill in the art upon reading the foregoing description. Accordingly, this disclosure includes all modifications and equivalents of the subject matter recited in the claims appended hereto as permitted by applicable law. Moreover, any combination of the above-described embodiments in all possible variations thereof is encompassed by the disclosure unless otherwise indicated herein or otherwise clearly contradicted by context.

What is claims is:

1. A rock drill automatic reversing system comprising:
   a rifle bar comprising a groove end and a pawl end, wherein the groove end has helical shaped grooves;
   a double pawl comprising a body, a first wing, and a second wing;
   a first pawl support having at least one first slot opening in a first radial direction and a second pawl support having at least one opposing slot opening in an opposing radial direction, the first and second pawl supports secured to the pawl end of the rifle bar, wherein the at least one first slot opening aligns with the at least one opposing slot opening to accommodate the body of the double pawl;
   at least one ring gear guide; and
   at least one control key rod that transverses parallel to the axis of the rifle bar within the first pawl support and the second pawl support to interact with the double pawl to change the direction of the rock drill depending on the at least one control key rod's state.

2. The automatic reversing system according to claim 1, further comprising a control plate that is at least partially free to rotate about the axis of the rifle bar, wherein the control plate comprises at least one countersink configured such that the at least one control key rod transverses parallel to the axis of the rifle bar by entering and exiting the countersink.

3. The automatic reversing system according to claim 2, wherein a ratchet ring encompasses the first pawl support, the second pawl support, double pawl and ring gear guide.

4. The automatic reversing system according to claim 2, wherein the control key rod can further comprise a control tip rod.

5. The automatic reversing system according to claim 2, wherein the first pawl support and the second pawl support further comprises at least one plunger hole wherein the plunger hole is configured to allow a plunger and a plunger spring to push against at least one of the ring gear guide and the double pawl.

6. The automatic reversing system according to claim 5, wherein the control key rod further comprises a control rod slot wherein the plunger on the first pawl support pushes against the double pawl first wing until the control key rod changes state then the plunger and plunger spring on the second pawl support pushes against the double pawl second wing changing directions of the drill.

7. The automatic reversing system according to claim 2, wherein the control plate is rotatably coupled to a control plate support ring, wherein the control plate support ring has a toothed outer circumference that engages with a toothed inner circumference of a ratchet ring such that the control plate support ring is unable to rotate relative to the ratchet ring.

8. The automatic reversing system according to claim 7, wherein the control plate comprises a control tooth and the control plate support ring comprises a support tooth such that the rotation of the control plate is at least partially constrained by the interaction of the control tooth with the support tooth.

9. The automatic reversing system according to claim 2, wherein the at least one countersinks is asymmetrically situated about the control plate.

10. The automatic reversing system according to claim 9, wherein the at least one countersink is a first countersink, a second countersink, a third countersink and a fourth countersink wherein the angular spacing between the first countersink and second countersink is between 50 and 90 degrees, and spacing between second countersink and third countersink is between 110 and 130 degrees, and spacing between third countersink and fourth countersink is between 50 and 90 degrees, and spacing between fourth countersink and first countersink is between 110 and 130 degrees.

11. The automatic reversing system according to claim 2, wherein the at least one countersink has at least 45-degree chamfer.

* * * * *